United States Patent [19]
Ohashi et al.

[11] Patent Number: 5,756,015
[45] Date of Patent: May 26, 1998

[54] METHOD FOR PRODUCING CYLINDRICAL CERAMIC BODY

[75] Inventors: Toshio Ohashi, Komaki; Sugio Miyazawa, Kasugai, both of Japan

[73] Assignee: NGK Insulators, Ltd., Japan

[21] Appl. No.: 654,267

[22] Filed: May 28, 1996

[30] Foreign Application Priority Data

Jun. 6, 1995 [JP] Japan .................. 7-139626

[51] Int. Cl.$^6$ .................................. C04B 35/115
[52] U.S. Cl. ................... 264/13; 264/63; 264/328.2
[58] Field of Search .................... 264/63, 328.2, 264/13

[56] References Cited

U.S. PATENT DOCUMENTS

| | | | |
|---|---|---|---|
| 4,407,967 | 10/1983 | Luks | 264/13 |
| 4,591,470 | 5/1986 | Goto et al. | 264/56 |
| 4,592,353 | 6/1986 | Daikuzuno . | |
| 4,693,244 | 9/1987 | Daikuzono . | |
| 4,736,743 | 4/1988 | Daikuzono . | |
| 4,784,812 | 11/1988 | Saitoh et al. | 268/328.2 |
| 5,008,054 | 4/1991 | Kato et al. . | |
| 5,087,594 | 2/1992 | Kato et al. . | |
| 5,154,708 | 10/1992 | Long et al. . | |
| 5,238,627 | 8/1993 | Matsuhisa et al. | 264/328.2 |

FOREIGN PATENT DOCUMENTS

| | | |
|---|---|---|
| 0115104 | 8/1984 | European Pat. Off. . |
| 0487172 | 5/1992 | European Pat. Off. . |
| 4198059 | 7/1992 | Japan . |

OTHER PUBLICATIONS

Patent Abstracts of Japan, vol. 16, No. 123, (P–1330), Mar. 1992.
Derwent Publications Ltd., Week 8629, Jun. 1986.
Patent Abstracts of Japan, vol. 16, No. 524, (C–1000), Oct. 1992.
Derwent Publications Ltd., Week 8413, Feb. 1984.
Patent Abstracts of Japan, vol. 15, No. 256, (C–0845), Jun. 1991.
Patent Abstracts of Japan, vol. 16, No. 110, (C–0920), Mar. 1992.
Patent Abstracts of Japan, vol. 16, No. 414, (M–1303), Sep. 1992.

*Primary Examiner*—James Derrington
*Attorney, Agent, or Firm*—Parkhurst, Wendel & Burr, L.L.P.

[57] ABSTRACT

A method for producing a cylindrical ceramic body having a hollow portion and having an uneven thickness includes the steps of: granulating a ceramic material powder to obtain granules having an average diameter of 50–90 μm and an apparent bulk density of 0.60–0.80 g/cm$^3$; mixing a binder with the granules to obtain a molding material; subjecting the molding material to an injection molding under a pressure of 500 kg/cm$^2$ or less to obtain a compact; removing a binder from the compact to obtain a binder-removed compact; and firing the binder-removed compact. The method can excellently mold and produce a cylindrical ceramic body which has a hollow portion therein, which is very thin, and which has an uneven thickness.

8 Claims, 1 Drawing Sheet

CUT FACE

1

METHOD FOR PRODUCING CYLINDRICAL CERAMIC BODY

BACKGROUND OF THE INVENTION AND RELATED ART STATEMENT

The present invention relates to a method for producing a cylindrical ceramic body. The cylindrical ceramic body has a very thin cylindrical (stick-like) configuration having a hollow portion therein and can be suitably applied to a medical laser knife, a laser probe, bipolar tweezers or pincette, or the like.

There has recently been used a laser knife as a knife to be used for a medical operation. As shown in FIG. 1, the medical laser knife is composed of a cylindrical ceramic body 2 having a hollow portion 1 and a fiber 3 for a laser inserted into the hollow portion 1. The cylindrical ceramic body 2 is made of sapphire or transparent alumina. A tip 4 of the laser knife is heated up to 700°–800° C. (red hot) by activating, for example, a YAG laser. An affected part of a patient is cut out by the heated laser knife, and at the same time the heated knife can stop bleeding. The tip 4 of the laser knife is subjected to a sputtering treatment using usually MgO or $TiO_2$ so that the tip 4 can easily absorb heat from the laser.

However, molding and producing the cylindrical ceramic body used for the aforementioned laser knife have been very difficult because the cylindrical ceramic body has a hollow portion therein and is very thin and the thickness of the cylindrical ceramic body is uneven.

As a material for producing the cylindrical ceramic body, there has conventionally been used a material (pellet) for injection molding, the material being prepared by subjecting a ceramic powder and a flux (sintering aid) to wet mixing so as to obtain a slurry, drying the slurry to obtain a dried material, grinding the dried material to obtain a ceramic material, and mixing a binder with the ceramic material. In this case, a dispersing condition is not sufficient and the material had a high viscosity. Accordingly, an injection molding required high pressure of about 700–1000 $kg/cm^2$. Such an injection molding with a high viscosity and under a high pressure causes problems. When a ceramic body has a complex configuration, (e.g., a cylindrical ceramic body having a hollow portion therein), a very thin thickness and uneven thickness, the core of the die is deformed, thereby deforming the precise contour of the hollow portion because the flow of the material is not even. Therefore, pressure cannot be applied evenly to the material. Additionally, the molding material cannot be packed stably in a thin portion of the ceramic body.

SUMMARY OF THE INVENTION

The present invention aims to solve the aforementioned problems and to provide a method for excellently producing a cylindrical ceramic body having a hollow portion therein, being very thin, and having an uneven thickness.

According to the present invention, there is provided a method for producing a cylindrical ceramic body having a hollow portion and having uneven thickness, comprising the steps of: granulating a ceramic material powder to obtain granules having an average diameter of 50–90 µm and an apparent bulk density of 0.60–0.80 $g/cm^3$; mixing a binder with the granules to obtain a molding material; subjecting the molding material to an injection molding under a pressure of 500 $kg/cm^2$ or less to obtain a compact; removing a binder from the compact to obtain a binder-removed compact; and firing the binder-removed compact.

DETAILED DESCRIPTION OF THE INVENTION

Figure 1:
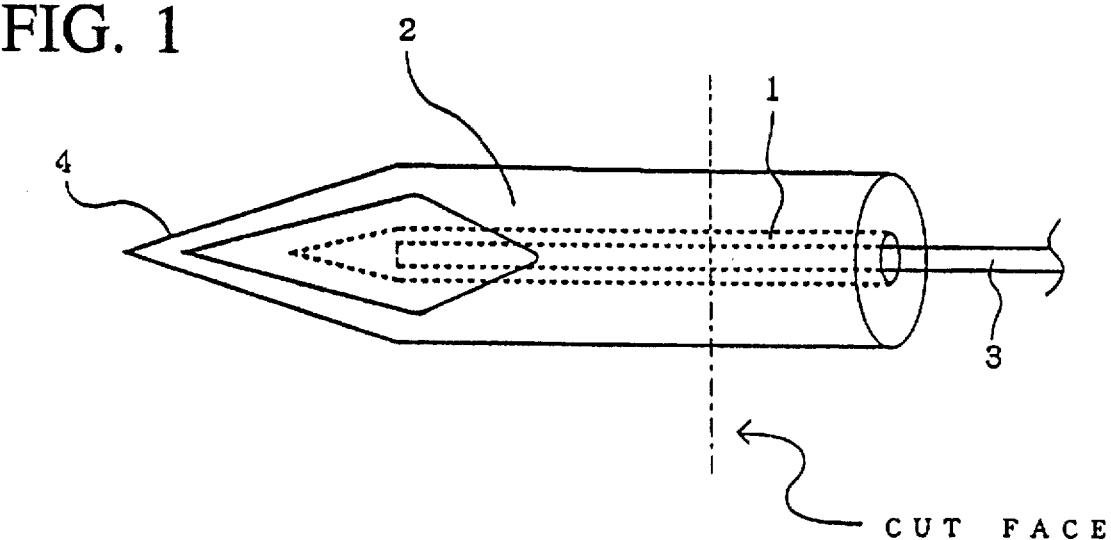
FIG. 1 is a perspective view showing an embodiment of a cylindrical ceramic body to be used for a medical laser knife of the present invention.

In the present invention, a cylindrical ceramic body having a hollow portion and an uneven thickness is produced by granulating a ceramic material powder to obtain granules, adding a binder to the granules to obtain a molding material, and subjecting the material to injection molding under a low molding pressure. Since round granules were used for molding, internal friction of the ceramic material in the molding material is reduced, and therefore, a viscosity of the molding material is decreased. As a result, a molding material can be stably packed in a thin portion even if the molding die is thin and has uneven thickness. Additionally, since a viscosity of the molding material is low, it enables use of a low molding pressure.

In the present invention, a mixture of granules and a binder is preferably subjected to hot kneading under a reduced pressure vacuum (vacuum of 500 mmHg or more) to obtain a material for injection molding (pellet). That is, a material for injection molding (pellet) is formed of a mixture of granules and a binder by a hot-kneading extruder. Since air is enfolded upon hot kneading, a pellet contains a large amount of air bubbles. When the pellet is subjected to injection molding, air bubbles remain in the molded body. Accordingly, in the present invention, a pressure in a vent room of a hot-kneading extruder is reduced to a vacuum of 500 mmHg or more so as to sharply reduce the number of air bubbles contained in a compact or a fired body.

Incidentally, when an ungranulated pellet is used as in the conventional method, a remarkable number of air bubbles remains in a compact because the pellet has a high viscosity.

The present invention is hereinbelow described in more detail.

First, a ceramic material powder is prepared. A kind of a ceramic material is not particularly limited. However, when a ceramic material is used for producing a medical laser knife, or the like, which requires transparentness, a transparent ceramic is preferable, and particularly, a ceramic comprising transparent alumina is preferable. A ceramic material powder preferably has a high purity and a small particle diameter (large specific surface area). With the ceramic material powder were mixed a sintering aid such as MgO and a proper quantity of water so as to obtain a slurry. The slurry is granulated by a spray drier, or the like.

A spray drying condition (granulating condition) is adjusted so as to obtain granules having an average diameter of 50–90 µm, preferably 60–80 µm, and an apparent bulk density of 0.60–0.80 $g/cm^3$, preferably 0.60–0.65 $g/cm^3$.

Subsequently, a binder is mixed with the obtained granules. As a binder, there is no limitation. However, a binder containing an acrylic resin is desirable because a strength of a green compact is enhanced and the binder is easily removed. An acrylic resin is preferably contained in a rate of 4.5–10 wt % of total weight of the binder, more preferably 5.6–7.6 wt %.

A material for injection molding (pellet) is made of a mixture of the granules and a binder by a hot-kneading extruder. Since air is prone to be enfolded in the pellet by hot-kneading and kneading, the obtained pellet contains a large amount of air bubbles. If this pellet is subjected to injection molding, air bubbles remain in the compact. To solve this problem, a pressure in a vent room of a hot-kneading extruder is preferably reduced to a vacuum of 500 mmHg or more, more preferably 700 mmHg or more, upon hot-kneading and kneading.

Thus obtained pellet preferably has a viscosity of 50–300 poise, more preferably 100–150 poise, which is measured by a flow tester at a temperature of 200° C.±20° C. Such a pellet can be stably packed in a thin portion even if a thin compact having uneven thickness is made by injection molding. Further, such a pellet can be subjected to injection molding under a low molding pressure.

Subsequently, the obtained pellet is subjected to injection molding to obtain a compact. Since the pellet has a low viscosity as described above, the injection molding can be performed under such a low pressure of 500 kg/cm$^2$ or less.

The binder in the obtained compact is then removed. In a binder-removing process, the compact is preferably kept in an alumina powder at a temperature of 300°–500° C. to avoid cracks on the like.

After the binder is removed, the compact is fired. The firing condition depends on a kind of a ceramic. When alumina is used, the compact is fired in a hydrogen atmosphere at a maximum temperature of 1700°–1800° C. More preferably, the firing process has two steps of calcining and sintering.

As described above, a cylindrical ceramic body is obtained in the method of the present invention. The ceramic body has a hollow portion therein and has an uneven thickness including a hollow portion. A ceramic body having such a configuration could not be properly produced by conventional injection molding. However, the present invention enabled production of a ceramic body having the aforementioned specific configuration under a low molding pressure by various devices such as a granulating process, a specification of properties of granules, a selection of binder, a specification of a viscosity of a pellet, etc.

An example of a specific configuration of a cylindrical ceramic body obtained by the method of the present invention is as follows. A cylindrical ceramic body has a cross sectional area of a hollow portion of 20 mm$^2$ or less when the cylindrical ceramic body is cut perpendicularly to the axis in a portion having an average thickness at the broken line shown in FIG. 1. A ratio of maximum thickness (b) and a minimum thickness (a), both including a thickness of a hollow portion, is b/a=10–30. The cylindrical ceramic has a length of 10–100 mm, is very thin, and has a hollow portion.

The present invention is hereinbelow described in more details with reference to Examples. However, the present invention is by no means limited to these Examples.

(EXAMPLE 1)

To an alumina material powder having a purity of 99.99% and a specific surface area of 5 m$^2$/g were added, as a flux, magnesium nitride of 750 ppm in terms of MgO and water. The material was then subjected to wet mixing and granulating so as to obtain a slurry having a concentration (alumina concentration) of 40 wt % and pH of 5.0.

The slurry was granulated by hot-air drying using a spray dryer. The obtained granules had an average particle diameter of 70 μm, a water content of 0.3%, and an apparent bulk density of about 0.70 g/cm$^3$.

With the granules (alumina granules) were mixed an acrylic resin binder in the rate of 73.6 wt % and 26.4 wt %, respectively. The acrylic resin binder contained an acrylic resin of 6.5 wt %, polystyrene of 4.5 wt %, polypropylene of 10.5 wt %, stearic acid of 2.2 wt %, and DOP (dioctyl phthalate) of 2.7 wt %.

Then, a material for injection molding (pellet) having a diameter of 2–5 mm was produced from the aforementioned mixture by using a hot-kneading extruder. A pressure in a vent room of the hot-kneading extruder was reduced to have a vacuum degree of 700 mmHg. The obtained pellet was measured for a viscosity by a flow tester. The viscosity was 150 poise at a temperature of 200° C.±20° C.

The pellet is subjected to injection molding so as to obtain a cylindrical ceramic body to be used for a medical laser knife, so as to have an external diameter of 2.5 mm, an internal diameter of 0.7 mm, a length of 27.5 mm, and a whole length from the end of the axis to the tip of 30 mm. Conditions of the injection molding were as follows:

Pressure upon injection molding ... 150 kg/cm$^2$

Temperature of nozzle ... 190° C. (Material viscosity: 130 poise)

Temperature of molding die ... 65° C.

Figure 2:
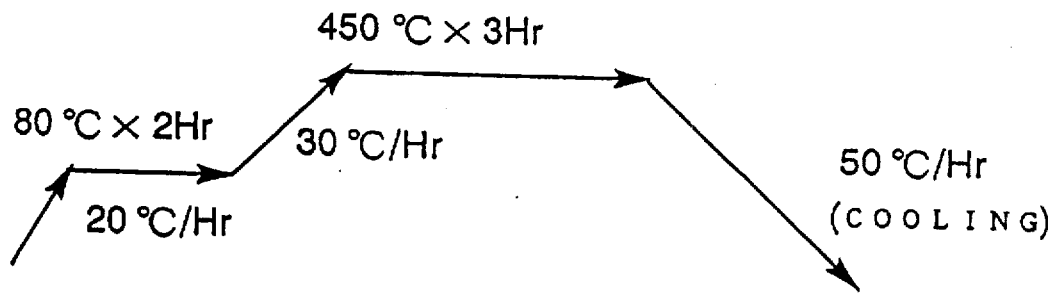
FIG. 2 is a graph showing a heat schedule in a degreasing process in Example 1.

Then, the obtained compact is subjected to binder removal. The binder-removing was followed by a heat schedule shown in FIG. 2 in an oxidizing atmosphere for 30 hours. The compact was subjected to a binder removal by being inserted perpendicularly into an alumina powder having high purity in an alumina sagger. The alumina powder having high purity is obtained by calcining granules at 1300°–1400° C.

After the binder was removed, the compact was fired. The firing was performed in two steps of calcining (first firing) and sintering (main firing).

Figure 3:
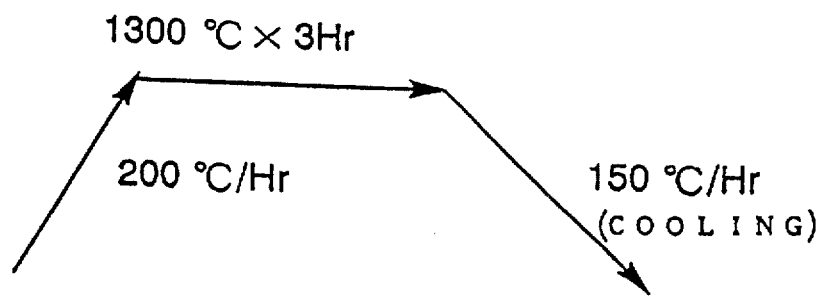
FIG. 3 is a graph showing a heat schedule in a sintering process in Example 1.

The compact was calcined in the same condition as the aforementioned binder-removing, i.e., in an alumina sagger so as to enhance strength of the compact and prevent the compact from warping upon sintering (main firing). The calcining was performed according to the heat schedule shown in FIG. 3 in an oxidizing atmosphere for 24 hours. The compact had a shrinkage of about 30–80 % of total shrinkage.

Adhered alumina powders were removed from the obtained calcined body. Then, the calcined body was disposed on a molybdenum setter and subjected to sintering in H$_2$ atmosphere at a highest temperature of 1700°–1800° C. for 3 hours to obtain a cylindrical ceramic body.

The ceramic body did not have any warpage or cracking even in the thin portion and had homogeneous quality. The ceramic body had an average particle diameter of 10–20 μm of crystals composing the ceramic body. The average particle diameter was obtained by taking a micrograph and measuring diameters. The measured sample was obtained by subjecting a cross section of a sintered ceramic to mirror-plane abrasion processing and subsequent thermal etching in H$_2$ atmosphere at 1550° C.

What is claimed is:

1. A method for producing a transparent cylindrical alumina body having a hollow portion and having an uneven thickness, comprising the steps of:

granulating an alumina powder to obtain granules having an average diameter of 50–90 μm and an apparent bulk density of 0.60–0.80 g/cm$^3$;

mixing a binder with the granules to obtain a molding material;

subjecting the molding material to injection molding under a pressure of 500 kg/cm$^2$ or less to obtain a compact;

removing the binder from the compact to obtain a binder-removed compact; and firing the binder-removed compact to form the transparent alumina body.

2. A method for producing a transparent cylindrical alumina body according to claim 1, wherein the binder contains an acrylic resin.

3. A method for producing a transparent cylindrical alumina body according to claim 1, wherein the hollow portion has a cross section of 20 mm$^2$ or less perpendicularly to the axis of the cylindrical ceramic body.

4. A method for producing a transparent cylindrical alumina body according to claim 1, wherein the maximum thickness (b) and the minimum thickness (a) of the cylindrical ceramic body including the hollow portion are in the ratio of b/a=10–30, and the cylindrical ceramic body has a length of 10–100 mm.

5. A method for producing a transparent cylindrical alumina body according to claim 2, wherein the content of the acrylic resin is 4.5–10 wt % of the total weight of the binder.

6. A method for producing a transparent cylindrical alumina body according to claim 1, wherein a mixture of the granules and the binder is subjected to hot kneading under a vacuum of 500 mmHg or more to obtain a material for injection molding.

7. A method for producing a transparent cylindrical alumina body according to claim 1, wherein the material for injection molding has a viscosity of 50–300 poise, measured by a flow tester at a temperature of 200° C. ±20° C.

8. A method for producing a transparent cylindrical alumina body according to claim 1, wherein said granulating step is carried out by spray-drying the alumina powder.

\* \* \* \* \*